Patented June 14, 1938

2,120,489

UNITED STATES PATENT OFFICE 2,120,489

PROCESS OF PREPARING FOOD PRODUCTS FROM PAPAYA FRUIT

Theodoor Alexander de Neve, Batavia, Java, Dutch East Indies

No Drawing. Application April 14, 1937, Serial No. 136,957. In the Netherlands March 31, 1936

2 Claims. (Cl. 99—156)

The invention relates to the preparation of food products from papaya fruit.

Up to the present it was not very well possible to prepare commercial food products from the flesh of ripe papaya fruit. The greatest obstacle to any steps in this direction resided in the fact that the ripening process, after the papaya fruit has nearly matured, progresses with such rapidity that the fruit is soon converted into a pulpy mass.

By the present invention this drawback is entirely obviated. The process according to the invention renders it possible to convert the ripe papaya fruit into various kinds of food products which are perfectly able to stand comparison with those obtained from other kinds of fruit that are more readily handled.

The process according to the invention consists in first immersing the substantially ripe flesh of the papaya fruit during a given time in a lime-containing liquid, e. g. lime water, or intimately contacting the said fruit flesh therewith in some other manner, after which it is rinsed and further made up into, for example, dried fruit products either candied or not, jams, jellies, fruit preserved in cans or glass jars, etc. to which any desired taste, flavor, and/or color may be given, e. g. by mixing the fruit with cold or hot solutions, or by boiling the fruit together with the same.

The lime solution is used in order to stop the ripening process, which in the nearly-ripened papaya fruit proceeds with extraordinary rapidity, and to impart to the fruit flesh a structure capable of adopting any desired taste, flavor and/or color, which purpose can only be realized by the loss of the original physical properties of the fruit.

I claim:

1. A process of preparing food products from papaya fruit, characterized by first intimately contacting the substantially ripe flesh of papaya fruit with a lime-containing liquid during a given time, subsequently rinsing the same, and thereafter making up the said fruit flesh into food products to which any desired taste, flavor and color may be given.

2. Process according to claim 1, characterized by immersing the flesh of the papaya fruit into the lime-containing liquid.

THEODOOR ALEXANDER DE NEVE.